(12) United States Patent
Ballarotti

(10) Patent No.: US 6,401,905 B1
(45) Date of Patent: Jun. 11, 2002

(54) DEVICE FOR ORIENTATING BOTTLES IN LABELING, FILLING, CAPPING MACHINES AND THE LIKE

(75) Inventor: Mario Ballarotti, Marmirolo (IT)

(73) Assignee: P.E. S.r.l., Porto Mantovano (IT)

( * ) Notice: Subject to any disclaimer, the term of this patent is extended or adjusted under 35 U.S.C. 154(b) by 0 days.

(21) Appl. No.: 09/541,505

(22) Filed: Apr. 3, 2000

(30) Foreign Application Priority Data

Apr. 13, 1999 (IT) .......................................... MN99A017

(51) Int. Cl.[7] .............................................. B65G 47/24
(52) U.S. Cl. ...................................... 198/394; 198/415
(58) Field of Search ................................ 198/415, 394, 198/570

(56) References Cited

U.S. PATENT DOCUMENTS

| | | | | |
|---|---|---|---|---|
| 2,543,142 A | * | 2/1951 | Wehmiller et al. | 198/415 |
| 3,169,629 A | * | 2/1965 | Randrup | 198/394 |
| 6,189,675 B1 | * | 2/2001 | Nosch | 198/394 |

* cited by examiner

Primary Examiner—Kenneth W. Noland
(74) Attorney, Agent, or Firm—Guido Modiano; Albert Josif; Daniel O'Byrne

(57) ABSTRACT

A device for orientating bottles in labeling, filling, capping machines and the like, comprising a turning element which is adapted to turn the bottles about an axis perpendicular to the conveyor belt until the intended position is reached, by making contact with the body of the bottles, and coordinated devices which are adapted to keep the head of the bottles in position during the orientation operation.

7 Claims, 2 Drawing Sheets

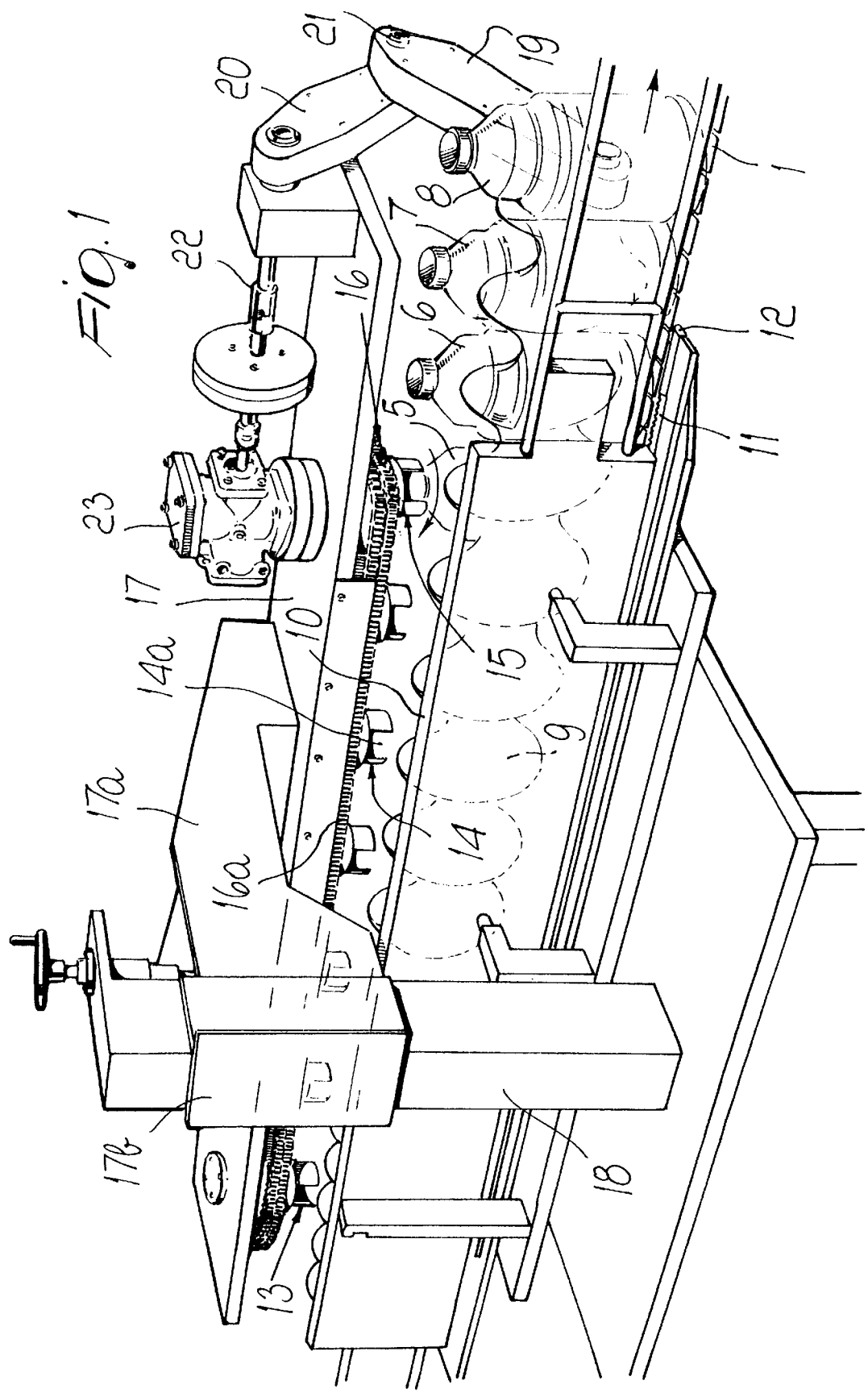

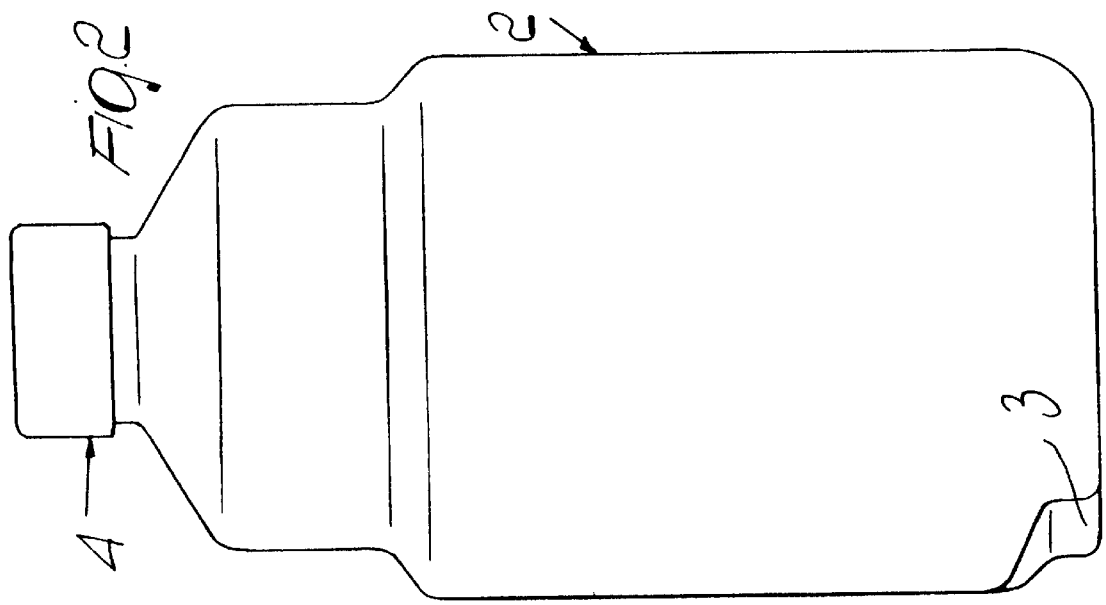
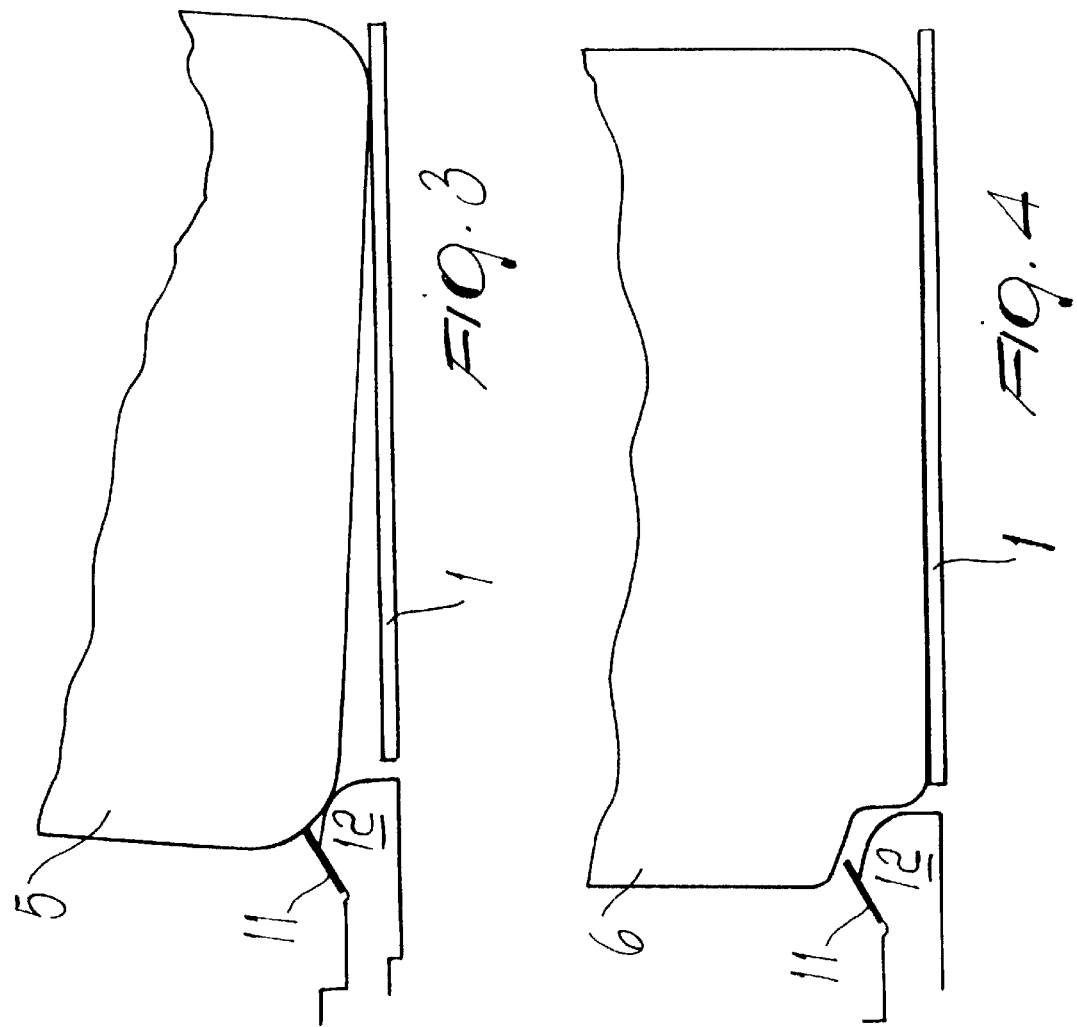

DEVICE FOR ORIENTATING BOTTLES IN LABELING, FILLING, CAPPING MACHINES AND THE LIKE

BACKGROUND OF THE INVENTION

The invention relates to a device for orientating bottles in machines for performing various operations such as labeling, filling, capping and the like.

It is known that certain kinds of bottles and containers in general require the label to be applied at a very specific region of their surface, for example at a frame region. Labeling machines are accordingly provided with a device, known as orientation device, which orientates all the bottles in the same direction on the belt that conveys them toward the device for loading the bottles onto the machine, said device being usually constituted by a loading star conveyor.

A similar device can also be present in filling and capping machines and the like.

With conventional devices, which operate so as to turn the bottles about an axis perpendicular to the conveyor belt into the chosen position making contact with the bottles at the surface of their body, it is not possible to achieve high productivity levels for the machines because, as the speed of the conveyor belt increases, the bottles tend to perform disorderly movements which compromise correct operation.

SUMMARY OF THE INVENTION

The aim of the present invention is to provide a device for orientating bottles in labeling, filling, capping machines and the like which gives said machines high productivity.

This aim is achieved by a device for orientating bottles in machines performing various operations such as labeling, filling, capping and the like, according to the invention, the bottles being conveyed by a conveyor belt on which they rest at their base and being in contact, at an intermediate region of the body, with a spacing screw feeder which operates in combination with an abutment facing the screw feeder so as to form a portion of space for the passage of the bottles conveyed by the belt, the device being characterized in that it comprises means adapted to turn the bottles about an axis which is perpendicular to the conveyor belt until the intended position is reached, making contact with the body of said bottles, and coordinated means adapted to keep the head of said bottles in position during the orientation operation.

BRIEF DESCRIPTION OF THE DRAWINGS

Further characteristics and advantages will become apparent from the description of a preferred but not exclusive embodiment of the device according to the invention, illustrated only by way of non-limitative example in the accompanying drawings, wherein:

FIG. 1 is a perspective view of the invention;

FIG. 2 is a view of a bottle being processed;

FIGS. 3 and 4 are views of a detail of two bottles in two different steps of operation.

DESCRIPTION OF THE PREFERRED EMBODIMENTS

With reference to the above figures, 1 designates the conveyor belt, which conveys bottles of the type shown in FIG. 2, comprising a body, generally designated by the reference numeral 2, which has a face 3 proximate to its base and a head generally designated by the reference numeral 4, said face 3 being termed "spot iv" in English-speaking countries.

The conveyor belt conveys the bottles that rest on it, moving in the direction of the arrow in the figure toward the loading star conveyor of a labeling machine. Reference numeral 5 designates a bottle during orientation and numerals 6, 7 and 8 designate three bottles which have left the device after being orientated, as explained in greater detail during the description of operation.

Moreover, the numeral 9 designates a screw feeder for spacing the bottles, which operates in combination with the fixed abutment 10 facing it, so as to form a portion of space for the passage of the bottles conveyed by the belt 1.

The device according to the invention comprises, first of all, means for turning the bottles about an axis perpendicular to the conveyor belt 1 until the chosen orientation position is achieved, said means comprising the saw-toothed element 11, which is arranged at the base of the fixed abutment 10 in a direction parallel to the direction of the belt 1 and adapted to make contact, with considerable friction, with the surface of the body of each bottle conveyed by the belt at the level of the spot iv 3 provided on the surface.

More specifically, it is noted that the saw-toothed element 11 is supported by the rounded frame 12 that lies at the base of the abutment 10.

The device according to the invention further foresees the presence of means adapted to keep in position the head 4 of the bottles during the orientation operation, so as to avoid abnormal movements of the bottles.

The means comprise a plurality of caps 13, 14 and 15 which are shaped like an inverted cup and have a wall provided with an opening for the access of the head 4 of a bottle, such as 14a for the cap 14, and are connected, so as to be mutually spaced with the same pitch as that of the spacing screw feeder 9, to the articulated chain 16, whose active portion 16a lies above the conveyor belt 1 and can move in the same direction, and at the same speed, as the belt 1.

The articulated chain 16 works between a driving wheel and a guiding wheel, both supported by the slider 17, rigidly coupled, by means of the arm 17a, to the sleeve 17b, which is slidingly associated with the vertical guide 18 in order to allow to process bottles of different heights. It is noted that the kinematic chain that transmits motion to said driving wheel, drawing it from the shaft of the screw feeder 9, comprises two articulated chains which are protected by the housings 19, 20, which are mutually articulated at 21, and the secondary shaft 22 for connection to the angular transmission element 23.

The length of the active portion 16a of the articulated chain 16 ensures that during orientation there is a cap in contact with the head 4 of each bottle throughout the step.

The operation of the invention is evident.

The bottles that move, conveyed by the belt 1, in the portion of space formed by the spacing screw feeder 9 and by the abutment 10 are turned about an axis perpendicular to the belt by the braking action applied to them by contact with the saw-toothed element 11: this is what is happening to the bottle 5, which, as clearly shown in FIG. 3, is in contact with the saw-toothed element 11, resting on the rounded frame 12, and turns in the direction of the arrow shown in FIG. 1.

From the beginning of the orientation operation, which coincides with entry into the portion of space formed by the screw feeder 9 and by the abutment 10, the head 4 of each bottle is inserted in a cap such as 13, 14, 15 and each bottle can therefore turn while being appropriately guided so that it does not leave the correct position.

Each bottle stops rotating when the intended orientation is reached, i.e. when the spot iv 3 is located in front of the saw-toothed element 11, causing a consequent loss of contact between the element and the bottle, as shown for the bottle 6 in the detail view of FIG. 4.

The described invention is susceptible of numerous modifications and variations, all of which are within the scope of the inventive concept: thus, for example, the saw-toothed element 11 is replaced with a strip of rubber if glass bottles are processed.

The device can also be used in cooperation with other bottle handling machines, suitable for performing various operations on bottles which require specific orientations.

The disclosures in Italian Patent Application No. MN99A000017 from which this application claims priority are incorporated herein by reference.

What is claimed is:

1. A device for orientating bottles in machines performing labeling, filling or capping operations comprising:
   a frame;
   lateral fixed abutments forming part of said frame and extending in a direction which is longitudinal with respect to said device;
   a slider forming a top portion of said frame extending in the same longitudinal direction as said fixed abutments;
   a conveyor belt arranged so as to travel within said frame along a longitudinal direction with respect to said frame, on which conveyor belt said bottles rest with their base region;
   a spacing screw feeder arranged in said frame in a parallel configuration with respect to said conveyor belt, said spacing screw feeder contacting the bottles at an intermediate body region;
   said fixed abutments facing the screw feeder so as to form a space portion for passage of the bottles conveyed by the belt;
   turning means for turning the bottles about an axis perpendicular to the conveyor belt until an intended position is reached, said turning means making contact with the body of the bottles;
   supporting means;
   movement means arranged with respect to said top portion of said frame so as to be at least partly movable along said longitudinal direction, said movement means carrying said supporting means for holding a head of said bottles steady with respect to said conveyor belt during orientation thereof.

2. The device of claim 1, wherein said supporting means comprise a plurality of caps, each of said caps providing a grip which contacts the head of each bottle during orientation thereof.

3. The device of claim 1, comprising
   a plurality of caps supported by said movement means, each of said caps providing a grip which contacts the head of each bottle during orientation thereof, wherein said supporting means further comprise
   a vertical guide;
   the slider being slidingly associated with said vertical guide,
   a driving wheel
   a guiding wheel; said wheels being supported by said slider
   an articulated chain mounted for actuation between said driving and guiding wheels, said articulated chain comprising
      an active portion lying above the conveyor belt of bottles,
      means being provided for ensuring that said chain is moving at a speed which is equal to the speed of said conveyor belt;
   said supporting means being arranged so as to be adjustable in the vertical direction,
   said caps being shaped like an inverted cup and including a wall provided with an opening for access of a head of a bottle, and being connected, so as to be mutually spaced with a same pitch as that of the bottle spacing feeder, to said articulated chain.

4. The device of claim 3, wherein said screw feeder comprises a shaft, said device comprising a kinematic chain for actuating said driving wheel, said shaft driving said kinematic chain.

5. The device of claim 4 for orientating bottles, said bottles having a reference spot at a body region thereof, said turning means comprising an element which runs parallel to the conveyor belt, provided on said abutment so as to make contact, with intense friction, with the region of the body of each bottle at the level of the reference spot iv provided thereon.

6. The device of claim 5, wherein said element provided on said abutment is saw-toothed.

7. The device of claim 5, wherein said element provided on said abutment is made of rubber.

* * * * *